United States Patent Office 2,716,778
Patented Sept. 6, 1955

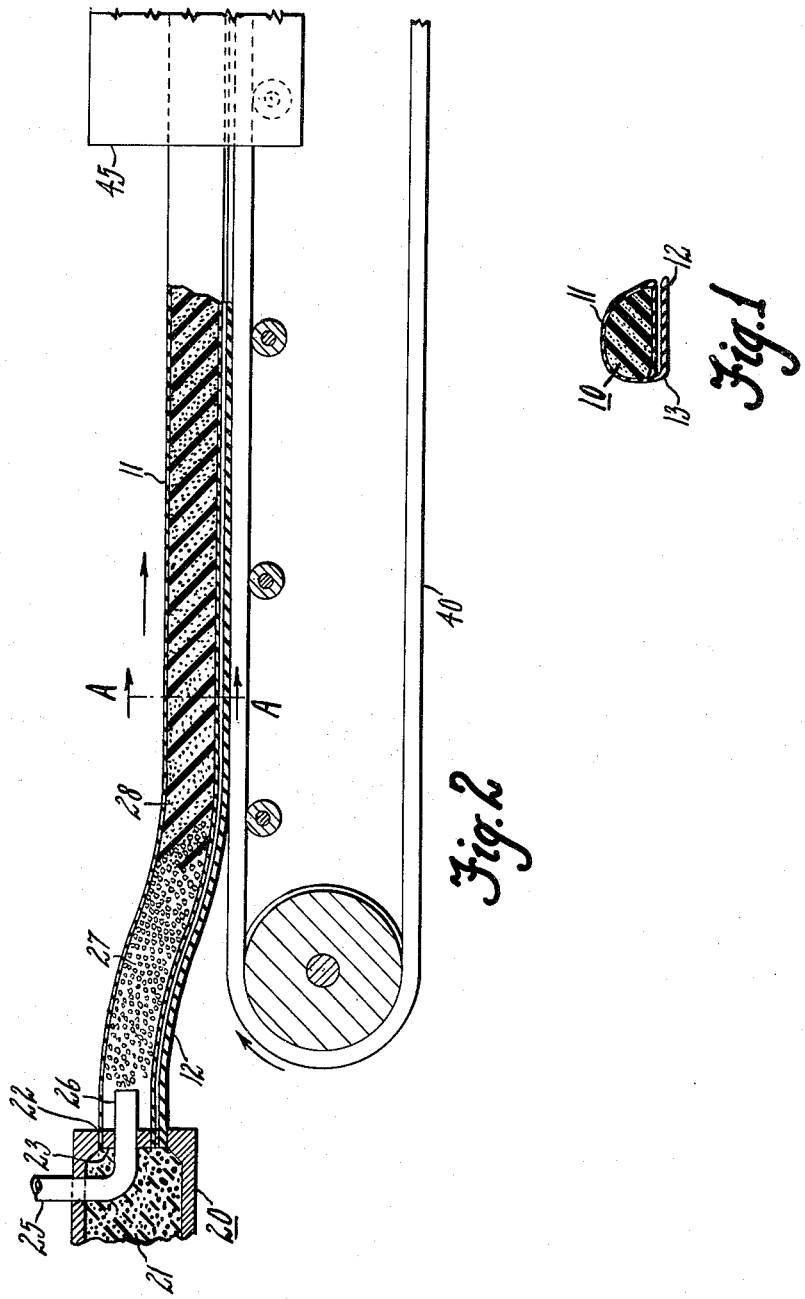

2,716,778

METHOD OF MOLDING SEALING STRIPS

Charles H. Beare, Dayton, Ohio, assignor to General Motors Corporation, Detroit, Mich., a corporation of Delaware Application February 6, 1951, Serial No. 209,624

5 Claims. (Cl. 18—53)

This invention relates to a cushioning sealing strip of rubber or rubber-like material especially adapted for use as a sealing strip for refrigerator doors and the like.

Sealing strips for this purpose made of sponge rubber material are well known, but such strips are subject to the defects of absorbing moisture, tending to stick to the door or door jamb surfaces against which they are compressed when the door is closed, and being relatively weak in structure and easily torn or otherwise damaged.

Also sealing strips made of soft rubber material having a compressible hollow air-filled bulb or channel are well known. Such hollow rubber channels must be made with a substantial wall thickness to provide the necessary strength and resistance to compression when first installed. Also such strips after a period of use are subject to the defect of cracking or failure of the relatively thick rubber walls at the longitudinal lines thereof where the partial collapse or bending of the cross section thereof is concentrated when the strip is repeatedly compressed in use. Such concentration of bending stresses in said walls results from the necessary substantial thickness of said walls and the lack of an interior cushioning filling within the hollow bulb.

Now an object of this invention is to avoid the above defects by providing a sealing strip of soft sponge rubber material enclosed within a protective outer casing having relatively very thin continuous walls of soft rubber or rubber-like material. Such thin outer casing will prevent the spongy material from absorbing moisture and from a tendency to stick to the door or door jamb surfaces against which it is compressed in use. Since the outer casing is surface bonded to the interior spongy material it may be relatively very thin and flexible and still have sufficient strength to withstand all ordinary wear and tear thereupon in use that is adapted to be repeatedly bent or compressed without cracking.

Another object of this invention is to provide an efficient and economical method of making such a sealing strip by first extruding the thin wall outer casing and progressively filling said casing with ungelled foamed latex material immediately after said casing is formed to prevent partial collapse or other distortion thereof due to its thinness and consequent lack of strength.

Further objects and advantages of the present invention will be apparent from the following description, reference being had to the accompanying drawings wherein a preferred embodiment of the present invention is clearly shown.

In the drawings:

Fig. 1 is a cross section of one form of the strip of this invention, but shows the thickness of walls of the outer casing exaggerated for sake of greater clearness.

Fig. 2 is a diagrammatic view illustrating how the method of this invention may be carried out.

The strip shown in Fig. 1 comprises a main body 10 of vulcanized foamed rubber latex material which has a soft and flexible cellular structure which is very freely compressible. This main body 10 is fully encased by and surface bonded to a thin exterior skin or casing 11 of soft rubber or similar rubber-like material. This casing 11 need have only such wall thickness as will provide a water-proofing skin on the main body 10 of the strip. Due to the fact that casing 11 is surface bonded thruout its entire surface to the spongy main body 10 and is supported thereby it is necessary that said casing 11 have only from one-half to one-third of the wall thickness ordinarily used in similar sealing strips having hollow bulbs. Thus economy in weight of material is obtained and a sealing strip having the inherent characteristic of being able to withstand repeated and/or continuous bending and/or compressing without having the walls thereof crack or split is provided.

A continuous longitudinal attaching flange 12 is formed integral with casing 11 and of the same material therewith, but the thickness of said flange 12 may be made as great as desired for strength purposes regardless of the thinness of casing 11. The flexible flange 12 is joined to casing 11 by the continuous flexible neck 13 and serves as the means for attaching the strip to a door frame member or door jamb by driving nails or screws thru said flange 12, or by any other attachment means, that are concealed in a channel formed between the flange and strip body as may be accomplished simply by swinging the main portion of the strip out of the way by hinging same about the flexible neck 13 so as to temporarily open the channel in an obvious manner.

According to this invention the thin-wall rubber casing 11 and the integral flange 12 are formed to the desired cross section by extruding same thru a correspondingly shaped extrusion aperture, in a well known manner. Fig. 2 shows the extrusion head 20 from which the extruded thin-wall casing 11 and integral flange 12 continuously emerge at a constant rate. As the tubed casing 11 leaves the extruding aperture it is filled with a suitable ungelled foamed latex compound which is flowed thereinto at a low pressure, preferably no greater pressure than is required to cause such filling. The conduit 25 thru which the foamed latex compound enters casing 11 extends thru the interior of the pressure chamber 21 behind the extrusion aperture 22 and thence out thru the otherwise closed off central portion 23 of the extrusion die. The freely flowing ungelled foamed latex material 27 is delivered centrally of casing 11 by the nozzle 26 within a short distance, say one inch, of the extrusion aperture 22 so that casing 11 will be filled as soon as is practical after it leaves the extrusion aperture.

Preferably a quick gelling foam latex compound is used so that it will gel within a short distance, say a foot or two, of the tubing head 20 and thereafter provide an interior support for the thin-wall casing 11 which in its uncured newly extruded condition is weak and flimsy and hence subject to collapse or other distortion unless supported by some means. In Fig. 2 the heavy cross section lines beginning at point 28 indicates the gelled foamed latex compound. Fig. 1 of the drawings may be considered as showing a cross section thru the uncured strip at line A—A in Fig. 2. Upon gelling the injected foamed latex compound sets and becomes an adequate interior support for maintaining the sectional shape of the thin-wall casing 11 until it is finally cured in any suitable manner.

In the diagrammatic showing in Fig. 2, the extruded and filled strip passes continuously from the extruder head 20 upon a belt conveyor 40 which is suitably driven at the same rate of travel as that of the emerging strip. Conveyor 40 supports and conveys the strip thru a vulcanizing chamber 45 maintained at the proper temperature to progressively and continuously cure the strip as it passes thru said chamber 45. During such curing the thin-wall rubber casing 11 and the foamed latex filler material are cured simultaneously and surface bonded to one another and thereafter form a strong integral structure. The final cured strip is very soft and yieldable under compression due to its soft spongy main body 10, while the thin-wall casing 11 prevents it from acting as a sponge to absorb water and serves as a protective skin that is not subject to cracking as sharp bends or creases will not be formed on the wall portions thereof when the strip is bent or repeatedly compressed so the strip will be able to withstand a rough surface wear and have a long service life.

While the embodiment of the present invention as herein disclosed, constitutes a preferred form, it is to be understood that other forms might be adopted.

What is claimed is as follows:

1. The steps in the method of making a cushioning strip of rubber material, comprising: extruding a plastic soft rubber compound thru an extrusion aperture to form a thin-wall collapsible hollow casing, simultaneously and progressively filling said casing with ungelled foamed latex material before said casing collapses by flowing said latex material thereinto thru a conduit passing thru the central portion of said extrusion aperture from the pressure side to the outside of said aperture, progressively gelling said foamed latex filling, after entering said casing and thereby providing a substantial interior support for said thin-wall casing and preventing said casing from collapsing, and subsequently vulcanizing together said casing and filling to form a thin-wall flexible casing filled with spongy rubber.

2. The steps in the method of making a cushioning sealing strip of rubber-like material, comprising: continuously extruding uncured rubber-like material through an extrusion aperture to form a thin-walled hollow casing of the desired cross section, simultaneously and continuously completely filling said casing with ungelled foamed latex material immediately after said casing is formed at said extrusion aperture, continuously gelling said foamed latex filling within said casing for providing an interior support for the thin-wall casing, continuously conveying said filler casing away from the point of extrusion thereof, and subsequently and simultaneously curing the material of said casing and the foamed latex filler therein while simultaneously forming a vulcanized bond therebetween while said casing is unconfined.

3. The steps in the method of making a cushioning sealing strip of rubber-like material, comprising: continuously extruding uncured rubber-like material through an extrusion aperture to form a thin-walled hollow casing of the desired cross section, continuously and continuously completely filling said casing with ungelled foamed latex material by squirting said latex material thereinto longitudinally thereof through an interior conduit leading from the pressure side of said extrusion aperture and surrounded by said extrusion aperture, continuously gelling said latex filling within said casing for providing an interior support to prevent collapse thereof, and subsequently and simultaneously curing said extruded casing and foamed latex filling while simultaneously bonding one to the other while said casing is unconfined.

4. In a method of making a resilient elongate member of elastomeric material having a spongy filling therein, the steps comprising, continuously forming a hollow mold member of the cross sectional shape ultimately desired from uncured elastomeric material, progressively and simultaneously completely filling said mold member with latex foam by flowing said foam directly into the hollow mold member as it is formed, progressively gelling said foam within the mold member and finally simultaneously curing the mold member and the contained gelled foam for bonding the foam filling to the member while said mold is unconfined.

5. In a method of making a resilient composite elastomeric strip wherein a thin walled casing has a spongy filling therein, the steps comprising, continuously extruding a plastic soft rubber compound through an extrusion aperture to form a thin walled hollow mold of a predetermined cross sectional shape, progressively and simultaneously completely filling said mold with latex foam by flowing said foam thereinto through a conduit passing through a central portion of the extrusion aperture, progressively gelling said foam latex within the mold thereby providing an interior support for said thin walled mold to prevent said mold from collapsing, and finally simultaneously curing and bonding together said mold and filling while said mold is unconfined to form a thin-walled flexible strip filled with spongy latex rubber.

References Cited in the file of this patent

UNITED STATES PATENTS

| Number | Name | Date |
|---|---|---|
| 706,590 | Osgood | Aug. 12, 1902 |
| 876,755 | Webb | Jan. 14, 1908 |
| 936,722 | Howard | Oct. 12, 1909 |
| 2,308,971 | Carter | Jan. 19, 1943 |
| 2,363,051 | Dosmann | Nov. 21, 1944 |
| 2,421,625 | Kretschmer | June 3, 1947 |
| 2,452,607 | Slaughter | Nov. 2, 1948 |
| 2,459,120 | Spraragen | Jan. 11, 1949 |
| 2,538,406 | Allen | Jan. 16, 1951 |